United States Patent

[11] 3,633,384

[72] Inventor Bert Jarren
P.O. Box 3074, Beverly Hills, Calif. 90212
[21] Appl. No. 43,142
[22] Filed June 3, 1970
[45] Patented Jan. 11, 1972

[54] UNIVERSAL COUPLING
7 Claims, 9 Drawing Figs.
[52] U.S. Cl. ........................................................... 64/31
[51] Int. Cl. ........................................................ F16d 3/04
[50] Field of Search ............................................. 64/16, 31

[56] References Cited
UNITED STATES PATENTS
2,219,591  10/1940  Hiester ........................ 64/16
1,972,779  9/1934  Kradoska ..................... 64/31
2,343,244  3/1944  Rose ............................ 64/31
3,063,265  11/1962  Schmidt ....................... 64/31

*Primary Examiner*—Edward G. Favors
*Attorney*—Lyon & Lyon

ABSTRACT: A universal coupling primarily intended for connecting a pair of noncoaxial shafts; that is, shafts which are angularly related or misaligned, the coupling including a pair of ball members mounted on the shafts and journaling encompassing structures having interior portions conforming to the ball members, the structures being rigidly connected by bars or incorporating gears, or connected sheaves or sprockets which tend to maintain the encompassing structures in coplanar relation, the structures being connected to the ball members by diametrically disposed key slot and pivotal key elements to effect a drive connection between the shafts.

PATENTED JAN 11 1972 3,633,384

INVENTOR.
BERT JARREN
BY
Lyon & Lyon
ATTORNEYS

UNIVERSAL COUPLING

BACKGROUND AND SUMMARY OF THE INVENTION

Often the problem of aligning displaced or angular shafts for connection, so that rotation of one may be transferred to other, is a difficult one. The present invention is directed to a solution of this problem and is summarized in the following objects:

First, to provide a universal connection between two misaligned or angularly related shafts for transmission of force therebetween, wherein each shaft is provided with a ball member joined by pivotal key and slot means to an encompassing band structure having a mating internal surface, the band structures being mechanically connected for transmission of force.

Second, to provide a universal coupling as indicated wherein the bands are rigidly connected.

Third, to provide a universal coupling as indicated wherein the bands carry interconnected gear, sheave or sprocket elements.

Figure 1:
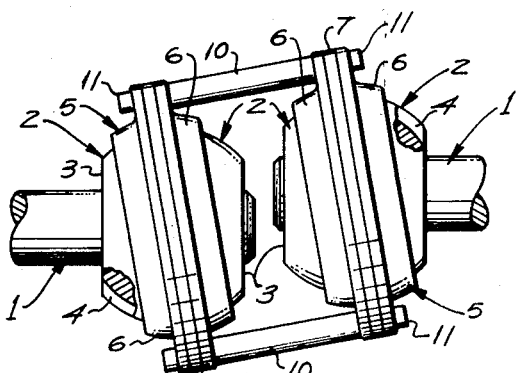
FIG. 1 is a side view of the universal coupling, showing the coupling attached to two parallel but offset shafts.

Reference is first directed to FIGS. 1 through 4. In the construction here illustrated each of a pair of shafts 1 is provided with a spherical or ball journal 2 secured thereto by conventional means. The journals preferably have flat ends 3 perpendicular to the axis of its corresponding shaft.

Each ball journal is provided with a pair of diametrically disposed key slots 4, which define a plane common to the axis of the corresponding shaft.

Each ball journal receives an enclosing structure 5, which comprises a pair of flanges 6 of L-shaped cross section, their radially inner sides defining spherical zones dimensioned to conform to the ball journal. The pair of flanges is separated by a spacer ring 7. The spacer ring is provided with diametrically disposed notches 8, which receive key pins 9 dimensioned to be received in the key slots 4.

The enclosing structures 5 mounted on the two ball journals are joined together by a pair or more of tie bars 10, secured by screws 11 extending through the radially outward portions of the flanges 6 and the intervening spacer ring 7. If desired, additional screws, not shown, may be employed to join the flanges and spacer rings.

Figure 2:
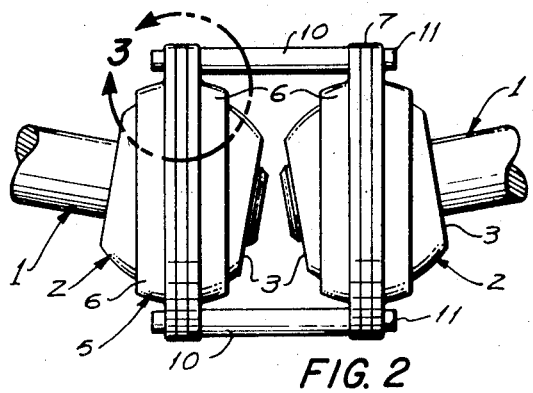
FIG. 2 is a similar side view, showing the universal coupling attached to two angularly related shafts.
Figure 3:
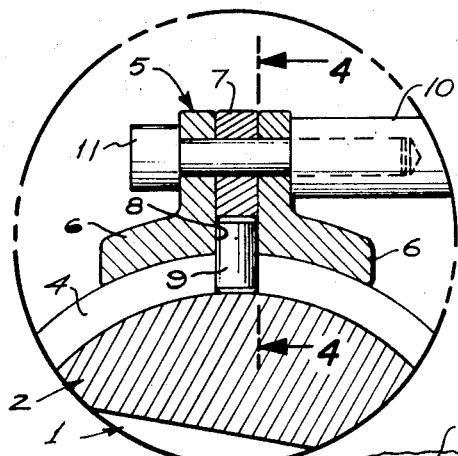
FIG. 3 is an enlarged fragmentary sectional view, taken within circle 3 of FIG. 2.
Figure 4:
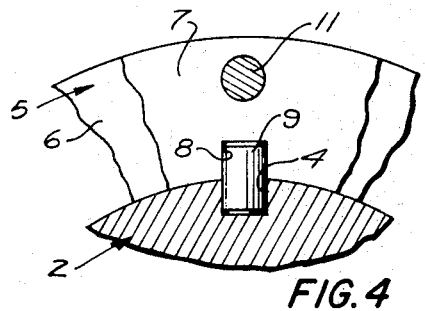
FIG. 4 is an enlarged fragmentary sectional view, taken through 4—4 of FIG. 3.

Operation of the universal coupling shown in FIGS. 1 through 4 is as follows:

The shafts 1 are suitably mounted for rotation in bearings, not shown. By reason of the coupling, the shafts may be offset, as shown in FIG. 1, or in angular relation, as shown in FIG. 2, or a combination of both relations. Either shaft may be the drive shaft, and the other the driven shaft. The rotational force exerted by the driving shaft is transmitted from its ball journal and enclosing structure through the tie bars 10 to the other enclosing structure and ball journal.

It should be noted that the rotation of the driven shaft is precisely the same as the rotation of the driving shaft; that is, for every degree of rotation of the driving shaft, the driven shaft also moves 2°. This is true even through the rotation of the enclosing structures and tie bars may not be precisely uniform.

Figure 5:
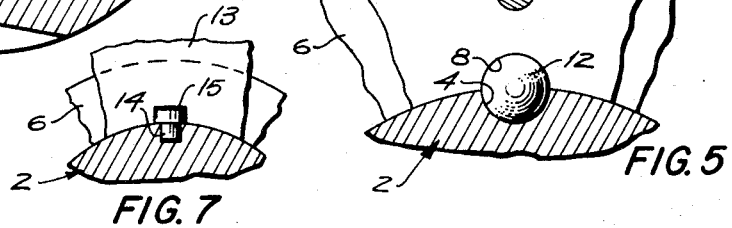
FIG. 5 is a fragmentary sectional view, similar to FIG. 4, showing a key ball in place of a key pin.

Reference is made to FIG. 5, which illustrates a ball key 12 substituted for a key pin 9.

Figure 7:
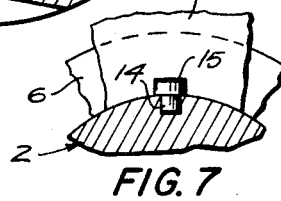
FIG. 7 is a fragmentary sectional view, taken through 7—7 of FIG. 6.
Figure 6:
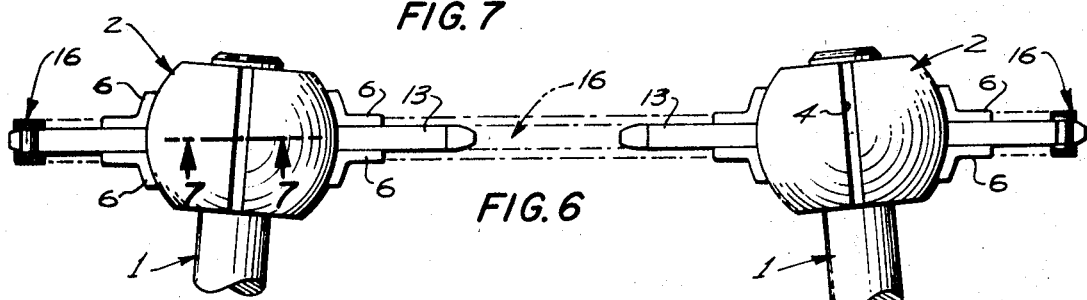
FIG. 6 is a top view, with portions in section, illustrating a construction in which sprocket and chain means is utilized to connect the two portions of the universal coupling.

Reference is now directed to FIGS. 6 and 7. In some instances it is desirable to connect shafts which are spaced a substantial distance and which may not be parallel. In this case, sprockets 13 are substituted for the spacer rings 7 and may be connected to their respective ball journals by key pins 9 or key balls 12 or by special key pins 14, having enlarged ends 15. The sprockets 13 are joined by a chain 16.

Figure 8:
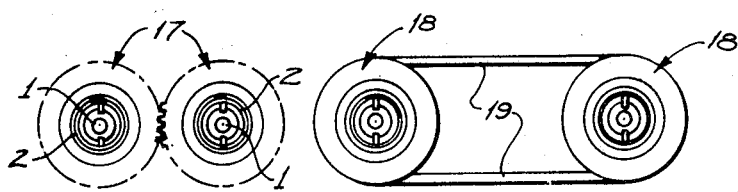
FIG. 8 is a substantial diagrammatical view, wherein the portions of the universal coupling are connected by intermeshing gears.
Figure 9:
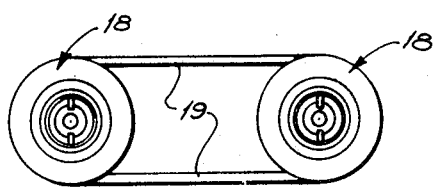
FIG. 9 is a similar essentially diagrammatical view, showing the coupling joined by pulley and belt means.

If desired, gears 17 which intermesh or are connected by an intervening gear may be substituted for the sprockets 13 and chain 16, as illustrated in FIG. 8. Still further, sheaves 18 and a connecting belt 19 may be substituted for the sprockets and chain, as shown in FIG. 9. In each of the constructions shown in FIGS. 6 through 9, the operation is essentially the same as that which occurs in the construction shown in FIGS. 1 through 4; that is, the torque of the driving shaft is transmitted to the driven shaft. It will be noted that if desired the speed of the driven shaft may be increased or decreased with respect to that of the driving shaft by use of sprockets, gears or sheaves of different diameter.

While particular embodiments of this invention have been shown and described, it is not intended to limit the same to the details of the construction set forth, but instead the invention embraces such changes, modifications and equivalents of the various parts and their relationships as come within the purview of the appended claims.

I claim:

1. A universal coupling for joining a pair of noncoaxial shafts, comprising:
   a. a ball member secured to each shaft and having at least one key slot defining a plane common to the axis of its shaft;
   b. a band structure internally contoured to receive each ball member;
   c. a key element journaled in each band structure and received in the key slot;
   d. and means connecting the band structures for transmission of force from one shaft to the other.

2. A universal coupling, as defined in claim 1, wherein:
   a. the connecting means is a plurality of rigid elements extending between the band structures to secure the structures in relatively fixed relation.

3. A universal coupling, as defined in claim 1, wherein:
   a. the connecting means includes a sprocket carried by each band structure and a connecting chain.

4. A universal coupling, as defined in claim 1, wherein:
   a. the connecting means includes a sheave carried by each band structure and a connecting belt.

5. A universal coupling, as defined in claim 1, wherein:
   a. the connecting means includes a pair of intermeshing gears carried by the band structures.

6. A universal coupling, comprising:
   a. a pair of ball members, each ball member adapted to be mounted on a shaft and each ball member having a pair of diametrically disposed key slots defining a plane common to the axis of its shaft;
   b. a pair of encompassing structures internally contoured to conform to the ball members;
   c. a pair of diametrically disposed key elements pivotally received in each encompassing structure and extending into corresponding key slots;
   d. and connecting means securing the structures in relatively fixed relation.

7. A universal coupling, as defined in claim 6, wherein:
   a. the connecting means tend to maintain key elements in a common plane.